United States Patent Office 3,506,376
Patented Apr. 14, 1970

3,506,376
METHOD AND APPARATUS FOR REGULATING A COMPRESSED GAS PRODUCER
Marcel Dangauthier, Paris, France, assignor to Automobiles Peugeot, Paris, France, a French body corporate
Filed Nov. 1, 1967, Ser. No. 679,792
Claims priority, application France, Nov. 10, 1966, 83,339
Int. Cl. F04b *49/00;* F04c *29/02;* F04d *29/06*
U.S. Cl. 230—14          11 Claims

ABSTRACT OF THE DISCLOSURE

A method for automatically regulating and installation for supplying a compressed gas to a utilization circuit, said method comprising regulating the pressure of the gas in the installation at the outlet of the compressor and at given stages of said regulation, recycling the air compressed in the compressor and regulating, in synchronism with said recycling, the flow of gas admitted through the normal suction aperture of the compressor, regulating the injection flow of said liquid at the inlet of the compressor and regulating the speed of the engine.

---

Figure 1:
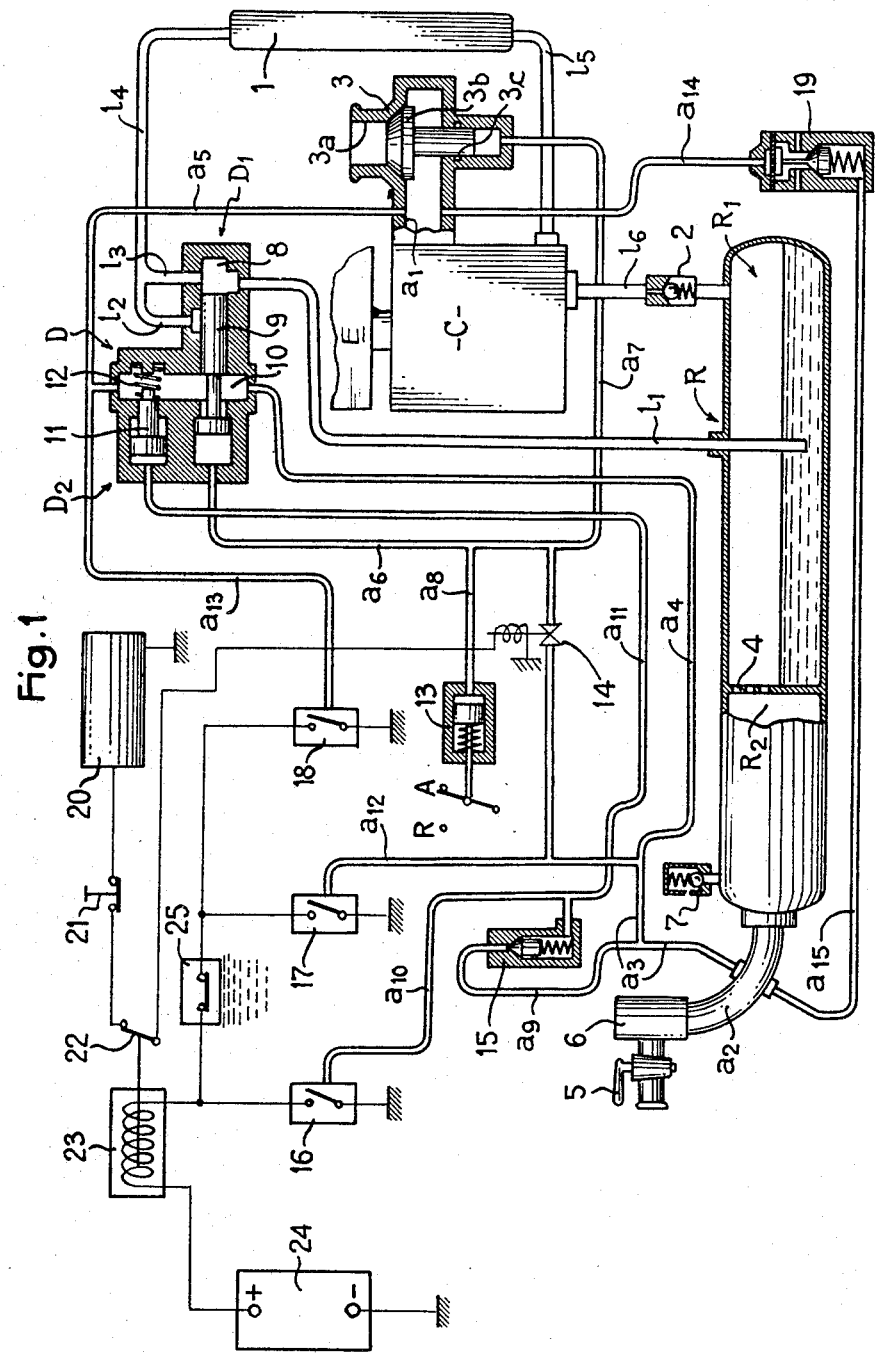
Figure 2:
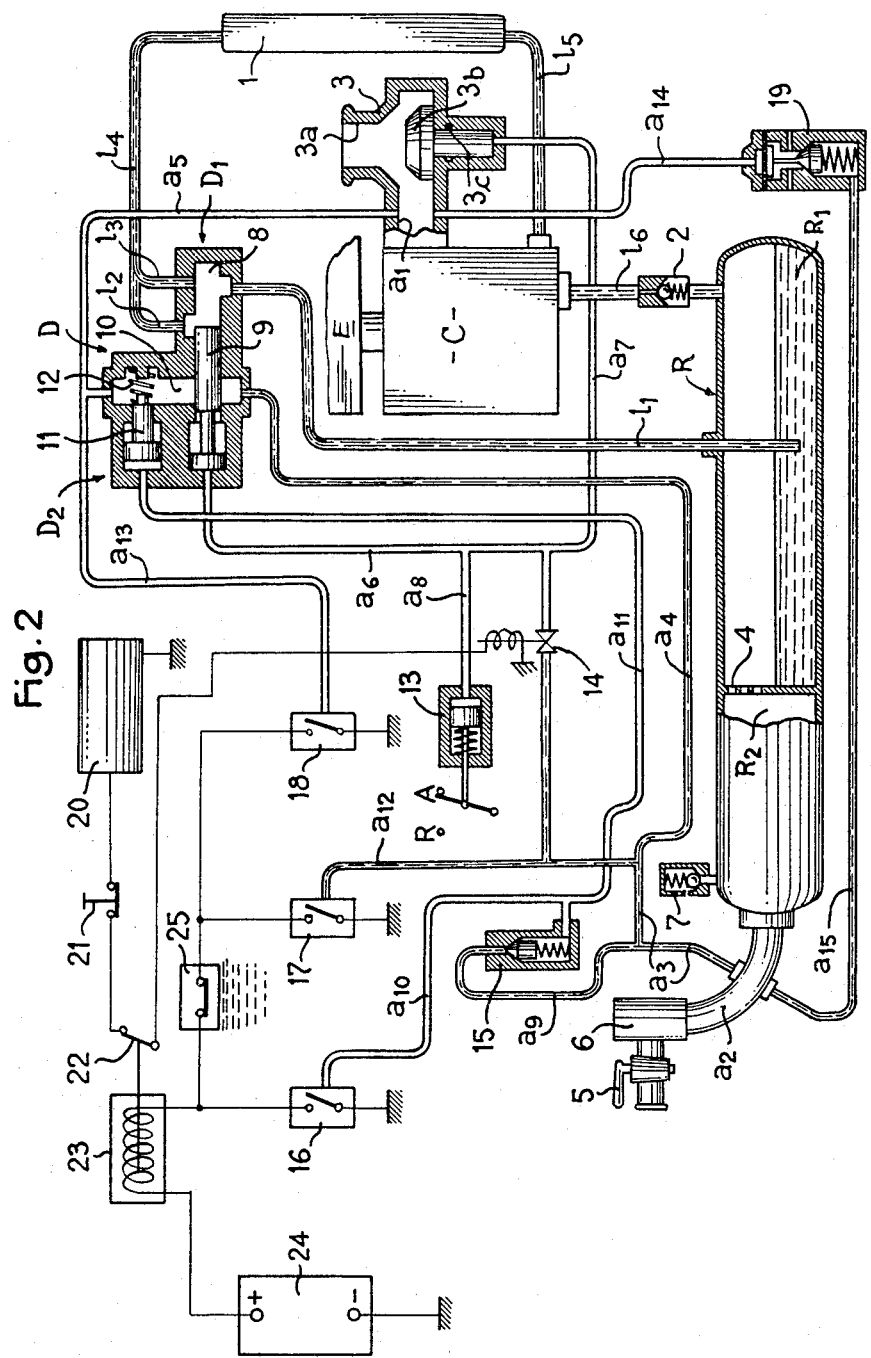
Figure 3:
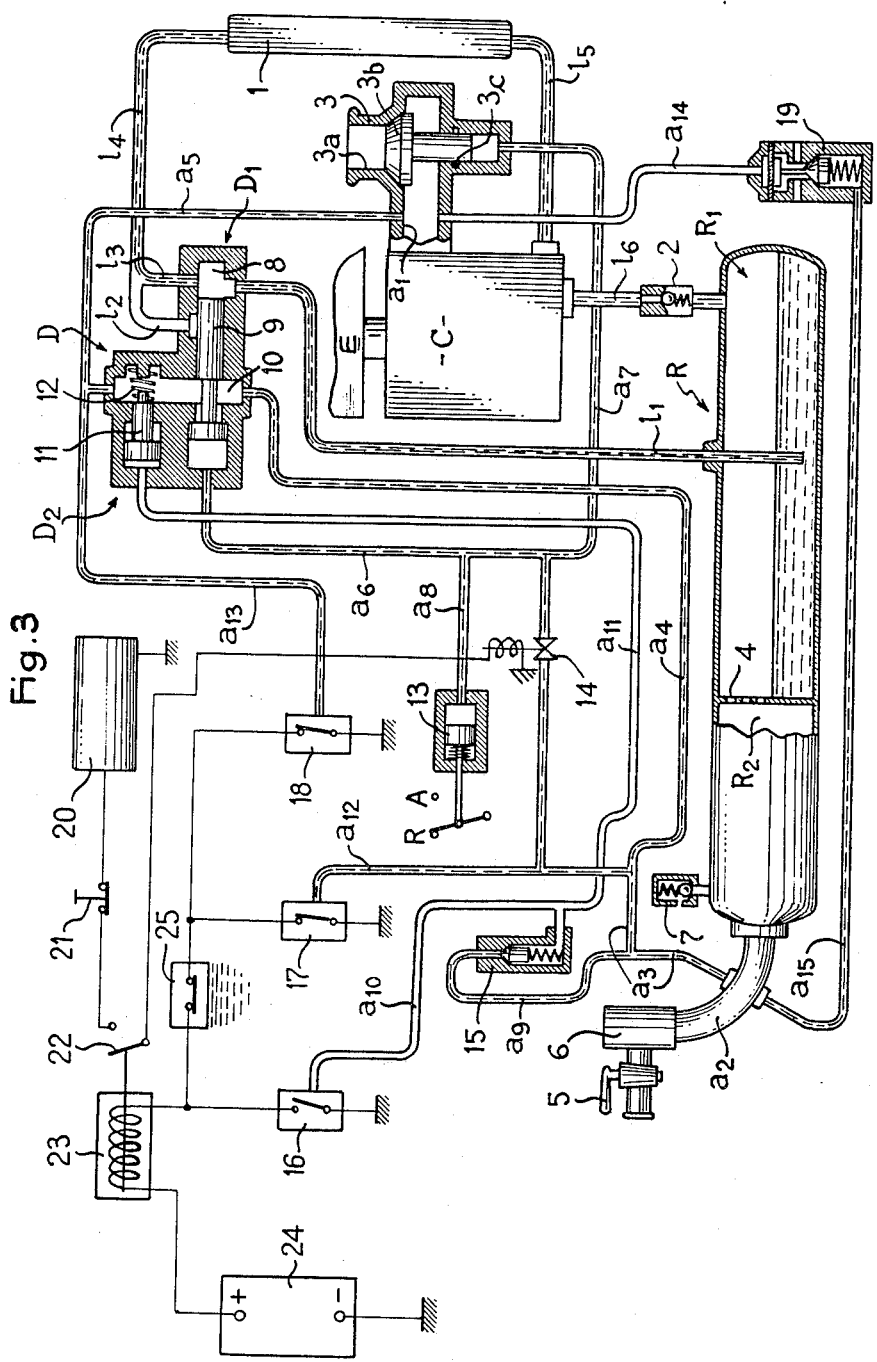
Figure 4:
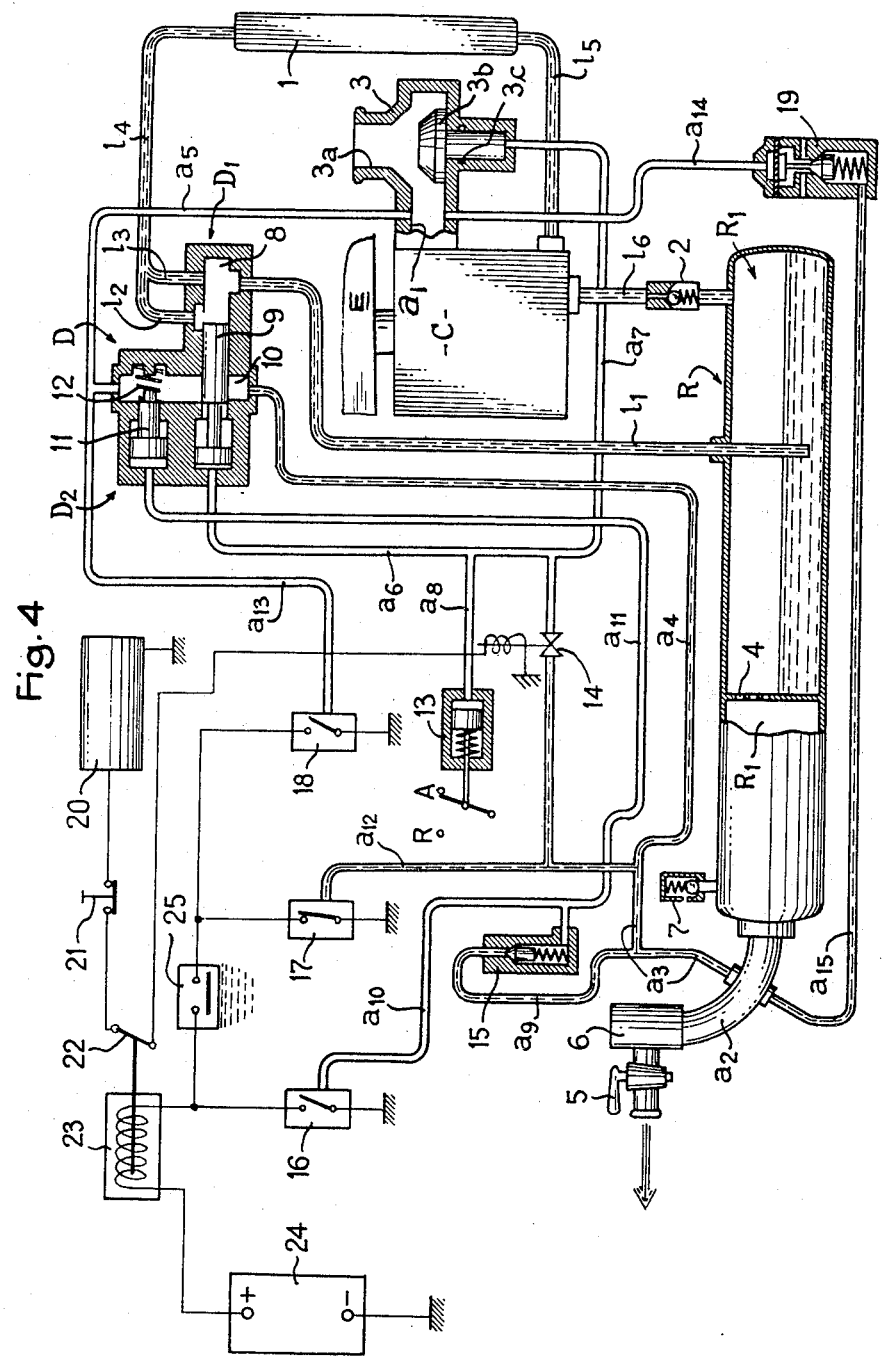

The present invention relates to installations supplying compressed gas.

The object of the invention is to provide such an installation provided with an automatic regulating device which ensures correct operation with maximum safety for both the equipment and user.

The invention provides a method for automatically regulating an installation which supplies compressed gas to a utilization circuit and comprises in combination a compressor of the type into which an appropriate liquid must be injected so as to perform functions, such as cooling, sealing and lubricating, and a motor driving said compressor, said method comprising regulating the pressure of the gas in the installation at the outlet of the compressor and at given stages of said regulation, recycling the air compressed in the compressor and regulating, in synchronism with said recycling, the flow of gas admitted through the normal suction aperture of the compressor, regulating the injection flow of said liquid at the inlet of the compressor and regulating the speed of the engine.

According to one manner of proceeding an "all-or-nothing" regulation is carried out, or, in other words, when the compressed gas is recycled, the normal inlet aperture of the compressor is closed simultaneously, the flow of liquid injected into the compressor is limited to a predetermined value, and the engine is made to rotate at a predetermined idling speed.

The recycling of the compressed gas is effected, on the one hand, when starting up, so long as the temperature of the engine has not reached a predetermined value, by maintaining the pressure of the gas in the installation at a relatively low value and, on the other hand, in normal operation, when hot, when the pressure of the gas in the installation exceeds a fixed value which is higher than the pressure of utilization and which can be in the neighbourhood of the nominal pressure of the compressor. This recycling precludes operation of the compressor as a "suction pump."

Another object of the invention is to provide an installation carrying out the method defined hereinbefore, said installation comprising in combination a compressor of the type into which must be injected an appropriate liquid for performing functions such as cooling, sealing and lubricating, an engine driving said compressor, and an automatic regulating device which comprises: a compressed air recycling circuit, a liquid feed circuit for the compressor, an inlet valve at the inlet of the compressor, a mechanism for varying the speed of the engine, and means for controlling, in synchronism, said circuits, the inlet valve and said mechanism.

According to one embodiment, said circuits are provided with throttle means which, in the same way as the inlet valve and the engine control mechanism, are actuated by means of the compressed gas circulating in the installation, and said means comprise an electrically controlled valve fed with electric current through a circuit in which are mounted components responsive to the values to be regulated, namely the pressure of the gas in the installation and the temperature of the engine.

Further features and advantages of the invention will be apparent from the ensuing description with reference to the accompanying drawing.

In the drawing:

FIGS. 1–5 are diagrams of an installation according to the invention illustrating various stages of its operation.

The various figures represent the same diagram at different moments of the operation of the installation which is adapted to supply to a circuit of utilization (not shown) gas under pressure and will be described with reference to any one of these figures.

This installation comprises an engine-compressor unit comprising an engine E, of which only elements useful to an explanation of the invention have been shown in the drawing, and a compressor C of the type in which an appropriate liquid, for example oil, performs the functions of cooling, sealing and lubricating.

The circuit of this liquid comprises a tank R, pipes $l_1 \ldots l_5$, $l_6$, a throttle device D which will be described hereinafter, a radiator 1 and a check valve 2 inserted in the pipe $l_6$ in which a compressed gas, for example air issuing from the compressor, also circulates.

The air, drawn in at atmospheric pressure, enters by way of a suction orifice 3a and a valve 3. The closing element 3b of the latter comprises a sealing ring 3c and is actuated by the pressure of the air in the manner described hereinafter. The air enters the compressor by way of an inlet conduit $a_1$ and issues from the compressor mixed with the liquid by way of the pipe $l_6$. Provided in the tank R is a separator 4. The liquid is recovered in the part $R_1$ of the tank whereas the dried compressed air issues from the other part $R_2$ of the tank by way of a conduit $a_2$.

Provided between the conduit $a_2$ and a utilization tap 5 is a valve 6 termed a minimum pressure valve which allows air to escape in the direction of tap 5 only if the pressure of the gas exceeds a value P, equal to 5 bars in the presently-described embodiment.

A safety valve 7 is mounted on the tank R.

Extending from the conduit $a_2$ is a conduit $a_3$ which forms an air recycling circuit with conduits $a_4$ and $a_5$ and the throttle device D. The conduit $a_5$ communicates with the inlet conduit $a_1$ of the compressor.

The illustrated device D is complex and simultaneously serves to control the recycling of the air and the flow of the liquid, these two operations being simultaneous. The throttle device D comprises a part $D_1$ in which the liquid circulates and a part $D_2$ which controls the flow of the gas.

The part $D_1$ comprises a chamber 8 with which communicates the inlet conduit $l_1$ and the two outlet conduits $l_2$ and $l_3$ of the liquid, the section of the outlet orifice corresponding to the conduit $l_3$ being constricted relative to that of the orifice corresponding to the conduit $l_2$.

A piston 9 movable in the chamber 8 controls the passage of the liquid through the conduit $l_3$ or simultaneously through the conduits $l_2$ and $l_3$.

The part $D_2$ of the distributor comprises a passage 10 the opening of which is controlled by the same piston 9 and whose sectional size can be reduced by means of a second piston 11 which is movable in opposition to the action of a spring 12.

The throttle member or piston 9 of the throttle device D and the valve member $3_b$ of the inlet valve 3 and an element 13 setting the engine at idling speed (normally maintained in the accelerating position A) are actuated by the pressure of the compressed air in the installation by way of the conduit $a_3$, an electrically operated valve 14 and conduits $a_6$, $a_7$, $a_8$.

A valve 15 is also provided which is subjected, by way of a conduit $a_9$, to the pressure of the compressed air and adjusted to open at pressure $P_1$ which is the normal pressure of the unit. This valve is connected by a conduit $a_{10}$ to a pressure-responsive switch 16 which is normally open and closes when the valve 15 allows the compressed air to pass under pressure $P_1$. This valve is also connected by way of a conduit $a_{11}$ to the throttle device D so as to actuate the piston 11.

Further, two normally open pressure - responsive switches 17 and 18 are adjusted to close when they are subjected by way of conduits $a_{12}$ and $a_{13}$ to pressures respectively equal to $P_2$ and $P_3$. In the chosen example, the pressures $P_1$, $P_2$ and $P_3$ can be chosen to equal 7.3 and 1.5 bars respectively.

A venting valve 19 for communication with the surrounding air is subjected on one side of a valve member $19^a$ fixed to a diaphragm $19^b$ to the pressure of the inlet of the compressor by way of conduit $a_{14}$ and moreover on the opposite side of said valve member $19^a$ to the pressure prevailing in the outlet conduit $a_2$ by way of conduit $a_{15}$.

The valve 14 is controlled by an electric circuit comprising in series the dynamo 20 of the engine, a switch 21 which is for instance the ignition switch of the engine and a normally closed switch 22 actuated by a relay 23.

This relay 23 is itself actuated by a circuit fed by the battery 24 of the engine, the opening or closing of this circuit being determined by the state of the pressure responsive switches 16, 17, 18 which are connected in parallel. A normally closed temperature responsive switch 25 is connected in series with the pressure-contacts 17 and 18 and opens and remains open when the temperature of the engine-cooling fluid exceeds a given temperature, for example 60° C.

The operation of this installation will now be described, the pipes under pressure in the various diagrams being shown with additional dotted lines so as to distinguish them from pipes in which the ambient pressure prevails.

In the diagram shown in FIG. 1, the engine-compressor unit is stationary and cold:

The device 13 is in the accelerating position A;
The valve 3 is closed;
The air and liquid circuits and the tank R are at atmospheric pressure;
The distributor D is in the illustrated position: the piston 9 opens the passage 10 for recycling the air and closes the normal liquid injection passage $l_2$. The piston 11 fully opens the air passage;
The valve 19 is closed.

As concerns the electric circuit:
The switch 25 is closed;
The pressure-responsive switches 16, 17, 18 are open;
The relay 23 is not fed, the switch 22 is in the closed position which closes the feed circuit of valve 14; but, as the dynamo 20 does not supply current, the valve 14 remains open and puts the outlet $a_2$ of the separator in communication with the device 13, the valve 3 and the piston 9 of the distributor.

The unit is then started up; the speed of the engine increases, a suction is established in the suction pipe $a_1$ of the compressor, the valve member $3_b$ moves away from its seat and the valve 3 opens.

The dynamo supplies current and the electrovalve 14 closes as soon as the speed of the engine reaches the value 1,200 r.p.m., that is to say, very rapidly. As the electrovalve closes, the piston 9 moves to the position shown in FIG. 2 and closes the air recycling circuit and opens the normal liquid injection conduit $l_2$.

As the tank R is cut off from the exterior, by the minimum pressure valve 6 even if the tap 5 is open, the pressure rises.

When this pressure reaches the value $P_2=3$ bars, the switch 17 is closed (FIG. 3), the relay 23 receives current and the contact 22 opens. The valve 14 is no more energized and this valve opens which moves the piston 9, the valve member $3_b$ and the device 13 setting the engine at idling speed. The recycling circuit is opened and the unit operates at idling speed at reduced pressure and in a closed circuit. The injection of the liquid is also reduced since only the conduit $l_3$ is fed.

The pressure-responsive switch 18 which is adjusted to be closed for a pressure $P_3$ which is less than $P_2$, for example 1.5 bars, regulates with the pressure-responsive switch 17 the pressure between 1.5 and 3 bars so long as the temperature of the engine has not reached 60° C.

There is thus automatically achieved in the course of this stage of operation a warming of the engine under relatively smooth operating conditions.

As soon as the temperature of the engine cooling water reaches 60° C., the switch 25 opens (FIG. 4), the feed circuit of the relay 23 is cut off and the switch 22 moves to the closed position. The electrovalve 14 is fed by the dynamo and closes, with the result that:

The piston 9 closes the recycling circuit and opens the normal liquid injection circuit;
The device 13 controlling the speed of the engine moves to the accelerating position;
The inlet valve 3 is opened.

The compressor then operates normally and the pressure of air increases in the tank. When it reaches the value $P=5$ bars, the minimum pressure valve 6 opens and allows the compressed air to travel through the utilization circuit.

Figure 5:
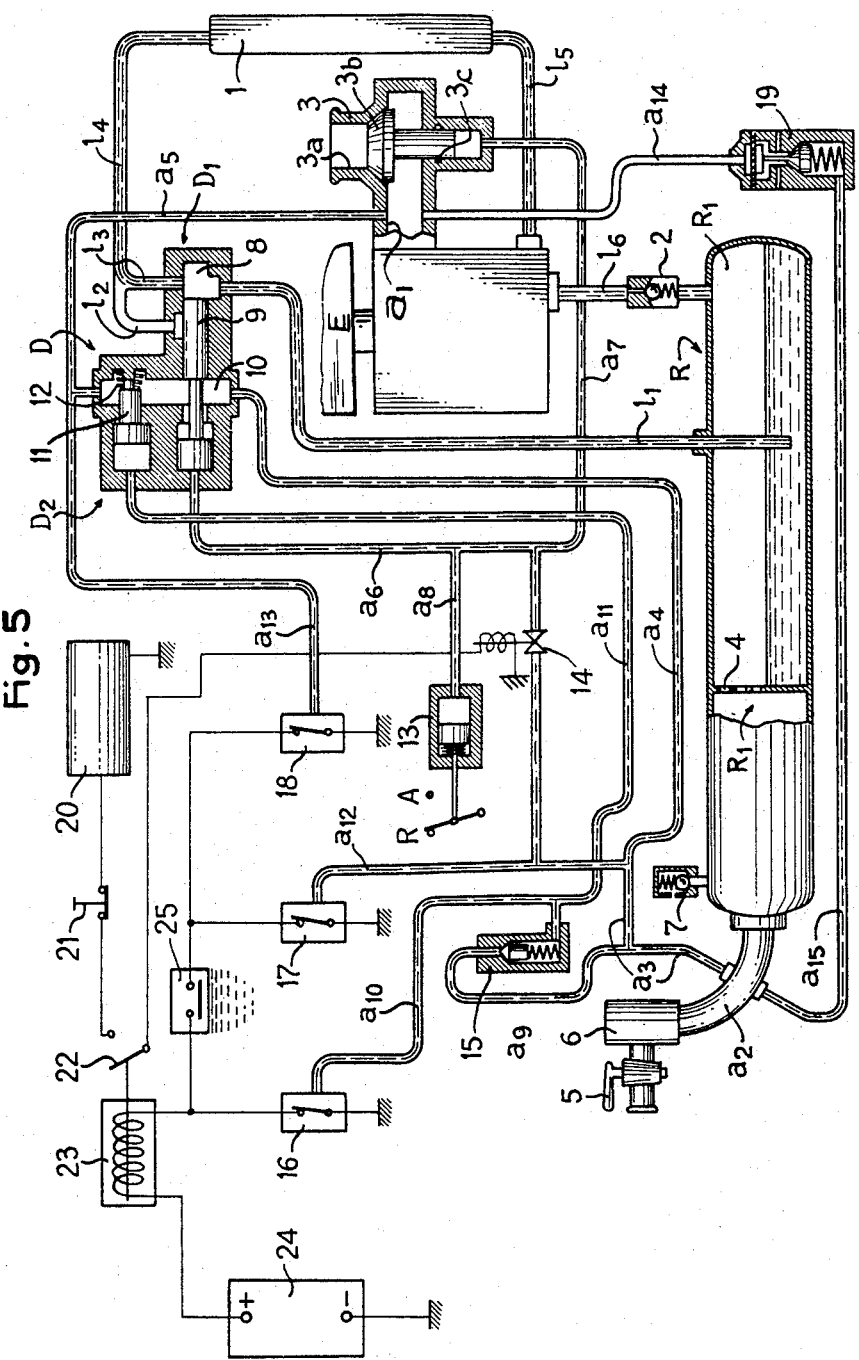

If the amount of air consumed by the user is equal to the output of the compressor, operation proceeds normally. On the other hand, if this consumption is less than the output of the compressor, the pressure increases in the installation up to value $P_1$ which is equal to the nominal pressure of the compressor at which it opens the valve 15 and closes the switch 16 (FIG. 5).

The relay 23 is fed, and the switch 22 opens, in the same way as the electrovalve 14 which is no longer fed. As before, in the course of operation at idling speed:

The piston 9 releases the recycling circuit and closes the main injection conduit $l_2$;
The valve 3 is closed;
The device 13 is put into the idling position.

Further, when the valve 15 opens, the conduit $a_{11}$ is fed and causes the piston 11 to move and this piston throttles the recycled air passage 10. The regulation is such that the recycling under these conditions, that is, at nominal pressure, is equivalent to the recycling at the previously-described low pressure.

The regulation at nominal pressure is therefore effected by means of the valve 15 and the pressure-responsive switch 16. The last operational stage which must be described is the stoppage of the unit. This stoppage is accompanied in all cases by the putting out of circuit of the valve 14, for example by means of the switch 21. The electrovalve is therefore open, as is the recycling circuit. As the compressor no longer rotates and the valve 3 is closed, the pressure in the inlet pipe becomes equal to that prevailing in the tank. The effective areas of diaphragm 19$^b$ and valve member 19$^a$ are such that when subjected to the same pressure, opens to atmosphere and this returns the tank and the various conduits to atmospheric pressure.

The valve member 3$_b$ of the valve 3 remains on its seat owing to the friction of the sealing ring 13$_c$, the device is returned by its return spring to the accelerating position and the installation is again in the initial condition shown in FIG. 1.

When the engine-compressor unit is started under hot conditions, switch 25 is open and valve 14 is closed so that the air recycling circuit is closed and the liquid feed circuit is fully open. Pressure increases in the tank to reach the nominal value of the compressor as explained hereinbefore with reference to FIG. 4.

As just described, this installation automatically regulates an engine compressor unit by recycling air under two different pressures, when starting up at low pressure and when hot at nominal pressure.

Further, the fluid controlling the regulating means is constituted by the compressed air of the installation which is particularly convenient since this compressed air also injects the liquid necessary for operation of the compressor owing to the pressure prevailing in the tank R.

Thus, an all-or-nothing regulation has been chosen, although it is relatively easy to achieve a progressive regulation of the same installation to which appropriate devices are added which ensure a progressive control of the valve 3, the pistons 9 and 11 and the device 13 controlling the speed of the engine.

If desired, the tank R can be combined with the chassis of the unit. The installation also comprises additional safety, control and other devices which have not been described in order to facilitate an understanding of the invention. The numerical values mentioned in the course of this description were given only by way of examples.

What is claimed is:

1. A method for automatically regulating an installation for supplying a compressed gas to a utilization circuit and comprising in combination a compressor of the type into which an appropriate liquid capable of performing functions such as cooling, sealing and lubricating must be injected, and an engine driving said compressor, said method comprising, recycling the gas compressed in the compressor, when said compressor is started, so long as the temperature of the engine has not reached a predetermined value, the pressure of the gas in the installation being maintained between two relatively low values, and in normal operation, when hot, when the pressure of the gas in the installation exceeds a fixed value which is in the neighborhood of the nominal pressure of the compressor, automatically regulating, in synchronism with said recycling, the flow of gas admitted through the normal suction aperture of the compressor, regulating the injection flow of said liquid at the inlet of the compressor and regulating the speed of the engine, and using the compressed gas supplied by the compressor for circulating and injecting said liquid into the compressor and for operating the regulating device of the installation.

2. A method as claimed in claim 1, wherein the regulation is an all-or-nothing regulation.

3. An installation as claimed in claim 6, further comprising a venting valve for communicating with the surrounding air, said venting valve comprising a body, a seat in said body, a valve member, a diaphragm fixed to said valve member, a venting port in said body between said seat and said diaphragm, one side of said valve being connected to the inlet pipe of the compressor whereas the other side is subjected to the pressure of the gas at the outlet of the compressor, the effective areas of the diaphragm and the valve member which are subjected to said pressures, respectively, being such that when said pressures are substantially equal, said valve-member is urged away from said seat and the tank and the whole installation is vented to atmosphere through said venting port.

4. An installation as claimed in claim 6, wherein the throttle means of the recycling and liquid feed circuits are formed in a single valve device comprising a body defining two distinct passages for the liquid and the gas respectively and a single throttle member which can move across both passages, between a first position in which both passages are open and a second position in which the gas passage is closed and the liquid passage is partially throttled.

5. An installation as claimed in claim 4, wherein the throttle element which limits the flow of the recycled gas at the first pressure value is also received in said body of the valve device.

6. An installation for carrying out the method according to claim 1, said installation comprising in combination a compressor of the type into which must be injected an appropriate liquid for performing functions such as cooling, sealing and lubricating, an engine driving said compressor, a tank for said liquid and for the compressed gas and a compressed air recycling circuit between said tank and the compressor, a liquid feed circuit between said tank and the compressor, the compressed gas acting as driving fluid for said liquid, separator means in said tank for separating the liquid from the compressed gas, an inlet valve at the inlet of the compressor, a mechanism for controlling the speed of the engine, throttle means in said gas recycling circuit and in said liquid feed circuit, respectively, said inlet valve, said speed control mechanism and said throttle means being simultaneously actuated by the compressed gas circulating in the installation, under the control of a single electrically operated valve, means being provided for actuating said electrically operated valve in response to the values to be regulated, namely the pressure of the gas in the installation and the temperature of the engine.

7. An installation as claimed in claim 6, wherein the electrically operated valve is connected in series in a circuit comprising the dynamo of the engine and a first switch, said first switch being controlled by components which are responsive to said values to be regulated.

8. An installation as claimed in claim 7, wherein a first of said components is a pressure responsive switch responsive to the gas pressure prevailing in the installation and adapted to energize said first switch and open the electrically operated valve when said pressure exceeds a first predetermined value in the neighborhood of the nominal pressure of the compressor, thus opening the gas recycling circuit, partially closing the liquid feed circuit, closing the inlet valve of the compressor and lowering the speed of the engine.

9. An installation as claimed in claim 8, wherein said first component is mounted in series with a valve rated at said pressure and adapted to transmit said pressure to a throttle element inserted in the gas recycling circuit which limits the flow of the recycled gas.

10. An installation as claimed in claim 9, wherein a second of said components is a pressure responsive switch responsive to the pressure prevailing in the installation and adapted to energize said first switch and open said electrically operated valve when said pressure exceeds a second predetermined value less than said first predetermined value, said second component being connected in parallel with said first component and in series with a thermo-contact which is responsive to the temperature of the engine and adapted to break the energization of said switch and close the electrically operated valve when said temperature exceeds a predetermined value.

11. An installation as claimed in claim 7, wherein a third of said components is a pressure responsive switch responsive to the pressure of the gas prevailing in the recycling circuit on the downstream side of said throttle means and is connected in series with said temperature responsive switch and adapted to energize said first switch and close said electrically operated valve when said pressure exceeds a predetermined value less than said second predetermined value, so long as the engine temperature has not reached said predetermined value.

References Cited

UNITED STATES PATENTS

| | | | |
|---|---|---|---|
| 2,023,418 | 10/1935 | Gustafson | 230—3 X |
| 2,665,839 | 1/1954 | Ostwald | 230—208 X |
| 2,894,677 | 7/1959 | Nash | 230—205 |
| 3,191,854 | 1/1965 | Lowler et al. | 230—210 |
| 3,260,444 | 7/1966 | Williams et al. | 230—138 |

WILLIAM L. FREEH, Primary Examiner

U.S. Cl. X.R.

417—27, 28, 42, 53, 228, 295